United States Patent [19]

Bouley et al.

[11] 4,412,012

[45] Oct. 25, 1983

[54] CURING POLYEPOXIDE RESIN BINDERS IN SYNTACTIC FOAM FORMING COMPOSITIONS

[75] Inventors: Robert W. Bouley, East Springfield; Robert F. Kovar, Wrentham, both of Mass.

[73] Assignee: Albany International Corp., Albany, N.Y.

[21] Appl. No.: 361,741

[22] Filed: Mar. 25, 1982

[51] Int. Cl.³ .............................................. C08J 9/32
[52] U.S. Cl. ...................................... 521/54; 521/55; 521/135; 521/178; 523/218; 523/219; 564/153
[58] Field of Search ................. 523/218, 219; 521/54, 521/55; 564/153

[56] References Cited

U.S. PATENT DOCUMENTS 3,296,153  1/1967  Snogren ................................. 521/54

OTHER PUBLICATIONS

"Handbook of Epoxy Resins", Lee et al., copyright 1967, Chapter 10, pp. 11 and 12.

Primary Examiner—Morton Foelak
Attorney, Agent, or Firm—Kane, Dalsimer, Kane, Sullivan & Kurucz

[57] ABSTRACT

Disclosure is made of a method of curing the polyepoxide resin binder component of polyepoxide based syntactic foams. Ketones are employed to reversably block primary amine groups on polyamine curing agents during the initial curing. As the cure progresses, the block is removed to complete the cure. The result is a moderation of peak exotherms generally associated with the cure, inhibiting degradation of the product foam.

3 Claims, No Drawings ns
CURING POLYEPOXIDE RESIN BINDERS IN SYNTACTIC FOAM FORMING COMPOSITIONS

BACKGROUND OF THE INVENTION

1. Field of the Invention

The invention relates to syntactic foams and more particularly relates to curing syntactic foam made with polyepoxide resin binders.

2. Brief Description of the Prior Art

The literature is replete with descriptions of prior art syntactic foams made by curing mixtures of microspheres with curable polyepoxides resin binders; see for example the description given in the U.S. Pat. No. 3,849,350.

The prior art techniques of curing the polyepoxide resin binders in syntactic foam forming compositions have been, in general, satisfactory when the article to be molded is relatively thin in dimensions, i.e; not having a thickness in excess of circa 10 to 12 inches. Thicker mouldings are not always satisfactory. The difficulty arises because the curing process is a chemical reaction, exothermic in nature. The general heat of reaction is desirable to sustain the curing reaction to completion. However, the syntactic foam being formed is a thermal insulator and as the exotherm continues, thermal energy is trapped within the body of the moulding. In thick mouldings lacking heat sinks or structural means for dampening the build-up of the exotherm, the heat build-up on the interior of the moulding can exceed temperatures which are degradative to the foam composition, i.e.; above about 400° F. When this happens, the resin binder of the moulding will degrade, split, char, become brittle, discolor and weaken.

By the method of the present invention, relatively thick mouldings, in all density ranges, may be made from syntactic foam forming compositions having a curable polyepoxide resin binder ingredient without exceeding temperature limits which would be degradative of the cured polyepoxide resin binder. The mouldings are particularly useful as buoyancy devices in marine applications.

SUMMARY OF THE INVENTION

The invention comprises a method of curing the polyepoxide resin binder component of a syntactic foam forming composition, which comprises in admixture a curable polyepoxide resin matrix and a filler which comprises a plurality of hollow microspheres, said composition containing less than 45 percent by volume of hollow macrospheres, comprising the steps of; curing the polyepoxide component with a curing agent which is the reaction product of (1) an organic polyepoxide curing agent possessing a primary amine group and (2) a ketone of the formula:

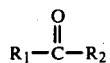

$$R_1-\overset{\overset{O}{\|}}{C}-R_2 \qquad (I)$$

wherein $R_1$ and $R_2$ are each independently selected from the group consisting of monovalent organic radicals.

The term "monovalent organic radical" as used throughout the specification and claims means an organic molecule including hydrogen atoms, one of which has been removed. Representative of monovalent organic radicals are hydrocarbyl. The term "hydrocarbyl" as used herein means the monovalent moiety obtained by removal of a hydrogen atom from a parent hydrocarbon, which latter, for example, contains 1 to 12 carbon atoms. Illustrative of such moieties are alkyl of 1 to 12 carbon atoms, inclusive, such as methyl, ethyl, propyl, butyl, pentyl, hexyl, heptyl, octyl, nonyl, decyl, undecyl, dodecyl and isomeric and unsaturated forms thereof; cycloalkyl of 3 to 8 carbon atoms, inclusive, such as cyclopropyl, cyclobutyl, cyclopentyl, cyclohexyl, cycloheptyl, cyclooctyl and the like; aryl of 6 to 12 carbon atoms, inclusive, such as phenyl, tolyl, xylyl, naphthyl, biphenyl and the like, aralkyl of 7 to 12 carbon atoms, inclusive, such as benzyl, phenethyl, phenpropyl, phenbutyl, phenpentyl, phenhexyl and the like.

The term "hollow microsphere" as used herein means a microscopic, hollow, spherical capsule such as is described in the U.S. Pat. No. 4,303,730.

The term "hollow macrosphere" as used herein means a macroscopic, hollow, spherical capsule (generally having a diameter of from ½ to 4 inches) such as is described in the U.S. Pat. No. 3,622,437.

The invention also comprises a class of novel polyepoxide curing agents.

DETAILED DESCRIPTION OF THE PREFERRED EMBODIMENTS OF THE INVENTION

The syntactic foams prepared by the method of the invention contain as a component, fillers which are hollow microspheres. Hollow microspheres are well-known filler materials as is the method of their preparation. For example, microspheres made of borosilicate glass in diameters of from about 20 to 10,000 microns are commercially available. Their preparation is well-known; see for example U.S. Pat. Nos. 4,303,730 and 4,303,732. Hollow microspheres of synthetic polymeric resin materials such as polystyrene are also known and have been used in the making of syntactic foams.

The syntactic foams prepared by the method of the invention may also contain as filler materials, hollow macrospheres such as is described in the U.S. Pat. No. 3,622,437. These macrospheres are generally formed of thermoplastic, synthetic polymeric resins in sizes having diameters of from about ½ to 4 inches. Generally, the syntactic foams prepared by the method of the invention will contain less than 45 percent by volume of such macrospheres. In the preparation of syntactic polyepoxide foams containing a greater percentage of macrospheres, control of the reaction exotherm is not as critical as is the case where the lesser percent is employed. This is because the large void spaces provided by the macrospheres in the body of the foam act as heat sinks and themselves moderate the exotherm peak associated with the curing of polyepoxide resin binders.

The filler components of the syntactic foams are held together in a polyepoxide resin matrix or binder component. In their preparation, a curable foam forming composition is made by admixture of a curable polyepoxide resin with any desired proportion of the fillers. The resin component is then cured, generally with an organic amine curing agent to obtain the syntactic foam.

The method of the invention may be employed to cure any polyepoxide syntactic foam forming binder resin. Thus, the polyepoxide may be aliphatic, cycloaliphatic, aromatic or heterocyclic in nature. Representative of such polyepoxide are:

(1) Diglycidyl ethers of aliphatic diols having 2 to 6 carbon atoms, inclusive, such as ethane-diol, propanediol, butanediol, pentanediol, hexanediol and isomeric forms thereof;

(2) The glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

(3) The glycidyl ethers of non-fused polynuclear phenols represented by the general formula:

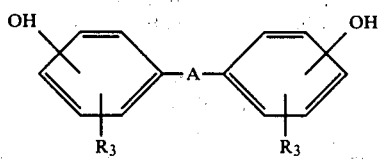

wherein $R_3$ represents from 0 to 4 substituents selected from the class consisting of halogen such as chlorine and bromine, and lower-alkyl, A is a bridging group selected from the class consisting of

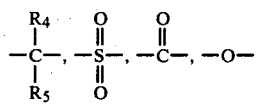

and a single covalent bond, wherein $R_4$ and $R_5$ each represent a moiety selected from the class consisting of hydrogen, lower-alkyl, lower-cycloalkyl and aryl. Illustrative of such compounds are the bis(glycidyl ethers) of:

4,4′-dihydroxydiphenylsulfone,
4,4′-dihydroxybiphenyl,
4,4′-dihydroxybenzophenone,
di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxyphenyl)-2-(4′-hydroxyphenyl)butane,
1-phenyl-1-(2-hydroxyphenyl)-1-(3′-hydroxyphenyl)butane,
1-phenyl-1-(2-hydroxyphenyl)-1-(3′-hydroxyphenyl)propane,
1-phenyl-1,1-di(4-(hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
bis(3,5-bromo-4-hydroxyphenyl)methane,
2,2-bis(3,5-dibromo-4-hydroxyphenyl)propane,
bis(3,5-dibromo-4-hydroxyphenyl)diphenylmethane,
1,1-bis(3,5-dibromo-4-hydroxyphenyl)-1-(2,5-dibromophenyl)ethane,
bis(3-bromo-4-hydroxyphenyl)sulfone and
bis(3,5-dibromo-4-hydroxyphenyl)sulfone; and (4) The glycidyl ethers of novolak resins. The novolak resins are the products obtained by acid condensation of phenol, or a substituted phenol, with formaldehyde and are conventionally represented by the general formula:

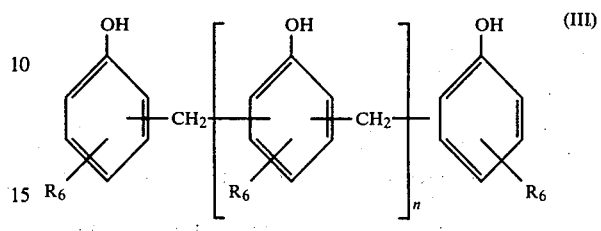

wherein n has an average value of from about 8 to 12 and $R_6$ represents from 0 to 4 substituents selected from halogen and lower alkyl groups. It is to be understood that the above formula is highly idealized and is an approximation only; see, for example, Carswell, "phenoplasts," pp. 29–35, Interscience, New York, 1947. A wide range of novolak resins of differing molecular weights is available commercially, all of which are represented approximately by the above formula. Since the class of novolak resins is so well recognized in the art, the epoxides derived therefrom by conversion of the novolaks to their glycidyl ethers (by conventional procedures, e.g., reaction with epichlorohydrin) may be referred to as "novolak resin glycidyl ethers."

Epoxide compounds characterized by having two terminal epoxy groups separated by the residue of a polyoxyalkylene glycol having a molecular weight of from about 100 to about 700 are well-known. They are illustrated by diepoxides of the formula:

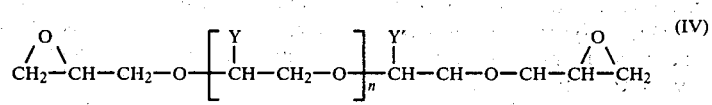

wherein Y and Y′ are each selected from the group consisting of hydrogen and methyl and n is an integer of from 1 to 10, inclusive. Representative of such diepoxides are those prepared by reaction of two moles of epichlorohydrin with one mole of a polyoxyalkylene glycol having a molecular weight of from about 100 to about 700. Polyoxyalkylene glycols are well-known compounds as illustrated by polyoxyethylene glycol and polyoxypropylene glycol.

The curing of a polyepoxide occurs primarily when there is a cross-linking between the epoxide groups of two separate polyepoxide molecules resulting in an infusible product resin. In the method of this invention, polyamines are employed as cross-linkers, the active hydrogens serving to open the oxirane rings on the polyepoxide and permit insertion of the nitrogen atom from the polyamine onto a carbon atom formerly part of the oxirane ring.

Polyamine agents for curing polyepoxides are well-known as is the method of their preparation. Representative of such agents are those of the formula:

wherein $R_7$ represents hydrocarbylene and n is an integer of from 1–5.

The term "hydrocarbylene" as used herein means the divalent moiety obtained upon removal of a hydrogen atom from a hydrocarbyl radical as previously defined.

Representative of polyamine curing agents of the formula (V) given above are ethylene diamine, diethylene triamine, diethyleneaminopropylamine, m-phenylenediamine, p-phenylenediamine, methylenedianiline, triethylene tetramine, tetraethylene pentamine, and the like.

In the method of the invention, the conventional and known polyamine curing agents such as those of the formula (V) given above are used, but their cross-linking ability is delayed or inhibited by reversably blocking all or some primary amine groups. During the curing period, the primary amine groups are unblocked. Normal cross-linking progresses over a longer than normal time period. This moderates the exotherm and the build-up of heat by allowing heat dissipation to occur at a rate greater than the thermal accumulation.

Although the inventors are not to be bound by any theory of operation for the method of their invention, a theoretical explanation of the moderated exotherm experienced may be postulated. It is believed that the ketone of formula (I) given above reacts with primary amine groups on the curing agent according to the schematic formulae:

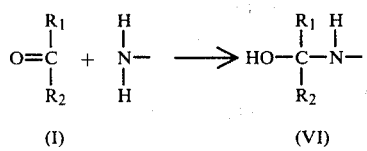

(I)    (VI)

wherein $R_1$ and $R_2$ are as previously defined. The addition compound of formula (VI) is unstable and eliminates a molecule of water to form the imine of formula:

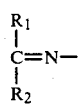

(VII)

thereby removing all active hydrogen atoms from the amine moiety. The ketone blocked polyamine therefore has fewer reactive sites for cross-linking the polyepoxide and there is a consequent lower exotherm. However, the C=N bond is hydrolytically unstable and as the cross-linking reaction continues, in the presence of the water, hydrolysis occurs to reverse the above described reaction between ketone and primary amine groups. As the regenerated primary amine groups appear, they become available to enter into reaction with unreacted epoxy groups, thereby completing the cure of the polyepoxide resin albeit at a time substantially after initial reaction of the polyepoxide resin and the curing agent. In this way, the period of the exotherm is drawn out to moderate high temperature through accumulation or retention of heat values within the body of the syntactic foam composition undergoing cure.

Preferred polyamine curing agents employed in the method of the invention are polyaminoamides and polyaminoimidazolines.

The polyaminoamides are carboxylic acid amides or polyamides containing one or more free amine groups which are directly attached to nitrogen (definition given in U.S. Pat. No. 2,760,944). Preferred for use in the present invention are polyaminoamides of the general formula:

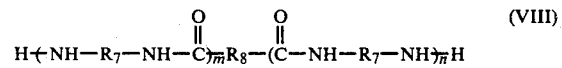

polyaminoimidazolines derived therefrom and adducts thereof with polyepoxides, wherein $R_8$ is the divalent residue obtained upon removal of a carboxyl group from an unsaturated fatty acid or when n is at least 1, two carboxyl groups a polymerized unsaturated acid; $R_7$ represents hydrocarbylene as previously defined (preferably alkylene of 2 to 5 carbon atoms, inclusive, eg; ethylene, propylene, butylene or pentylene); m is an integer of from 1 to 4 and n is an integer of 0 to 4.

The polyaminoamides of the formula (VIII) given above are generally well-known as is the method of their preparation; see for example the "Handbook of Epoxy Resins", Henry Lee and Kris Neville, Chapter 10 p. 5 [McGraw-Hill Book Company, (1967)] for the preparation and structure of simple polyaminoamides and U.S. Pat. No. 3,002,941 for the preparation of more complex polyaminoamides.

In general, the preferred polyaminoamides of formula (VIII) may be prepared by the condensation of unsaturated fatty acids or polymerized unsaturated acids with polyhydrocarbylene polyamines such as those of the formula (V) given above.

The unsaturated fatty acids are also well-known and include for example palmetic acid, stearic acid, elaidic acid, linoleic acid, linolenic acid, dehydrated castor oil fatty acid, elaostearic acid, tall oil fatty acids and the like.

Polymerized fatty acids are advantageously employed in the preparation of polyaminoamides of the formula (VIII) or the corresponding polyaminoimidazolines.

The polymeric fat acids are a mixture of dimeric and trimeric fatty acids resulting from the polymerization of drying or semi-drying oils or from the polymerization of the free acids or simple aliphatic alcohol esters of the acids of such oils as soybean, linseed, tung, cottonseed, corn, tall, sunflower, safflower and dehydrated castor oils. These may be polymerized by a simple thermal polymerization in which case the fatty acids of sufficient double bond functionality combine to provide a mixture of dibasic and higher polymeric acids. The acids with insufficient functionality to react remain as monomers and may be removed by distillation. Inasmuch as some monomeric fatty acid may be desired to control molecular weight as was indicated above, the amount of monomer left in the polymeric fat acids may be regulated for this purpose. In place of thermal polymerization for the production of the polymeric fat acids a catalytic method of polymerization such as, for example, the polymerization of mono or poly olefinic acids in the presence of such catalyts as ditertiary butyl peroxide may be employed. The resultant polymeric fat acids may retain residual unsaturation or may be saturated either as a result of the polymerization reaction or through hydrogenation.

Polyaminoimidazolines derived from the polyaminoamides are also well-known and may be prepared from polyaminoamides according to the scheme:

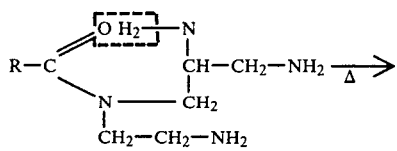

Polyaminoamide

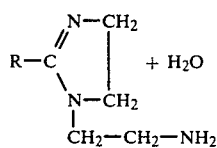

Polyamino-   Water
imidazoline by simply heating the polyaminoamide. If heating is stopped before there is a complete conversion to the polyaminoimidazoline, a compound is obtained having both amide and imidazoline groups or moieties. Strictly speaking, the polyaminoimidazolines employed in the invention need not be "derived" from polyaminoamides since it is well-known that they may also be prepared from the appropriate carboxylic acids directly according to the general scheme:

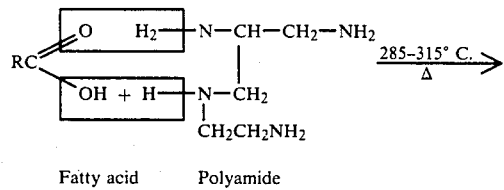

Fatty acid    Polyamide

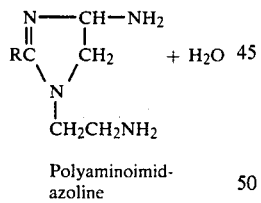

Polyaminoimid-
azoline as described in the "Handbook of Epoxy Resins", supra.

Adducts of the above-described polyaminoimides or polyaminoimidazolines with polyepoxides are also useful curing agents; see U.S. Pat. No. 3,474,056.

Advantageously the polyaminoamides and polyaminoimidazolines used in the invention have amine numbers of from 20 to 500, preferably 330 to 400. The "amine number" is defined as the number of milligrams of potassium hydroxide equivalent to the free amine groups of the resin.

The imines formed by the reaction of the ketones of formula (I) with the preferred polyaminoamides of formula (VIII) may be represented by the general formula:

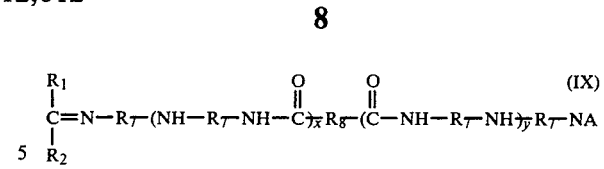

wherein $R_1$, $R_2$, $R_7$, $R_8$, m and n are as defined above, x is an integer of 0 to 3 and y is an integer of 0 to 3; and A is selected from the group consisting of the radical

and hydrogen. The imines of formula (IX) and the related polyaminoimidazolines are believed to be novel. They are prepared by mixing the ketones (I) and the polyaminoamides (VIII) or the corresponding polyaminoimidazolines together at ambient (room) temperatures in stoichiometric proportions, i.e.; a mole of ketone (I) for each primary amine group to be converted to an imine group.

Ketones of the formula (I) are generally well-known compounds as is the method of their preparation. Representative of the ketone (I) are acetone, methylethyl ketone, diethylketone, methylpropyl ketone, dipropyl ketone, methylisobutyl ketone and the like. Preferred in the method of the invention is acetone.

The solid syntactic foam forming composition is prepared by simple admixture of the composition ingredients employing conventional mixing apparatus and techniques. Preferably the curing agent and the ketone of formula (I) are premixed and reacted to obtain the modified curing agent, particularly the curing agent of the invention having the formula (IX) given above.

The proportions of ingredients mixed together to obtain the syntactic foam forming composition are, in general, conventional. The proportion of microspheres may constitute from 10 to 50 percent by weight of the composition. The proportion of curing agent is that required to cure the polyepoxide resin ingredient.

Additional ingredients may be added to the foam forming compositions as is conventional in the art. Representative of such additional ingredients are inert solvents for the epoxide reactant, inert fillers and reinforcing materials such as textile fibers and the like, flame retardants such as potassium and antimony salts and the like.

The following examples describe the manner and process of making and using the invention and set forth the best mode contemplated by the inventors for carrying out the invention but are not to be construed as limiting. All specified test results, where given, were according to the following procedures.

Compressive strength and compressive modulus tests were performed according to the ASTM procedure D-695.

Flexural strength tests were performed on cylindrical specimens with a diameter of one-half inch with a three inch support span, and using the equation.

$$S = 8PL/D^3$$

wherein P is the applied load at failure, L is the span and D is the specimen diameter.

Water absorption tests were carried out on discs with a diameter of $2\frac{3}{4}$ inches, and a thickness of $\frac{3}{4}$ inch. The test procedure consists of a hydrostatic pressure test at 550 psi, for up to 912 hours and the test results are reported as percent water absorption.

EXAMPLE 1

An appropriate vessel was charged with 500 gms of a polyaminoamide having an amine number of 370-400 (Versamid 140, Henkel, Minneapolis, Minn.). To the charge there was added with stirring 21.8 gms. of acetone. A mild exotherm was noted. After the exotherm ceases, the mixture is ready for use as a polyepoxide curing agent.

EXAMPLE 2

The procedure of Example 1, supra., was repeated except that in place of the 21.8 gms. of acetone as used therein, 43.5 gms. of acetone was added to the polyaminoamide.

EXAMPLE 3

An appropriate vessel was charged with 1500 gms of a diepoxide which is the bis(glycidyl ether) of 2,2-di-(4-hydroxyphenyl)propane (bisphenol A) having an average molecular weight of 380 and an epoxy equivalent weight of 190 (Epotuf 37-127, Reichhold Chemicals, Inc.). To the charge there was added with stirring 429 gms of hollow glass microspheres having a density of 0.15 gms/cc (Glass Bubbles, type C15/250, 3M Company, St. Paul, Minn.; 90 percent by volume having a diameter size between 20 and 130 microns) and the curing agent prepared in Example 1, supra. The resulting solid foam forming mixture was cast into a number of 12 inch diameter waxed cardboard tubes of varying height (10 to 16 inches) and thermocouples were positioned at the center of the castings. The tubes were placed in an environment at a temperature of about 80° F. After a period of about 24 hours the mechanical property specimens are placed in an oven adjusted to a temperature of about 180° F. and the castings are allowed to post-cure for a period of 20 hours. Representative portions of the cured foam are then observed for physical appearance. The observations and the thermocouple measurements are given in Table I, below.

Independently cast foam forming compositions were processed under vacuum, allowed to gel at room temperature and post cured at a temperature of 180° F. for periods up to 20 hours. The cured foams were tested for mechanical properties and the test results are given in Table 2, below.

The above procedure was repeated, except in place of the curing agent as used therein, 500 gms. of Versamid 140, supra., was used without modification with acetone. The resulting solid foam serves as a control, the physical properties and thermocouple measurements being given in the Tables 1 and 2 below.

Differential scanning calorimeter tests showed that the above foams do not contain unreacted epoxy groups.

EXAMPLE 4

The procedure of Example 3, supra., was repeated except that the curing agent is used therein was replaced with the curing agent prepared in Example 2, supra. Differential scanning calorimeter tests did not reveal any unreacted epoxy groups in the final foam products.

TABLE 1

| SOLID FOAM | PERCENT ACETONE PRESENT | THERMO-COUPLE MAX. TEMP. RECORDED (°F.) | FOAM CONDITION |
|---|---|---|---|
| CONTROL | | | |
| Casting Height | | | |
| 10 inch | 0 | 403 | Charred, |
| 12 inch | 0 | 403 | Brittle |
| 16 inch | 0 | 423 | |
| EXAMPLE 3 | | | |
| Casting Height | | | |
| 10 inch | 1.0 | 372 | White, |
| 12 inch | 1.0 | 381 | Good Foam |
| 16 inch | 1.0 | 340 | Appearance |
| EXAMPLE 4 | | | |
| Casting Height | | | |
| 10 inch | 2.0 | 330 | White, |
| 12 inch | 2.0 | 290 | Good Foam |
| 16 inch | 2.0 | 376 | Appearance |

TABLE 2

| FOAM | COMPRESSIVE STRENGTH (PSI) | COMPRESSIVE MODULUS (PSI) | FLEXURAL STRENGTH (PSI) | WATER ABSORPTION AFTER 912 HOURS (%) |
|---|---|---|---|---|
| CONTROL | 4352 | $1.84 \times 10^5$ | 3980 | 0.65 |
| EXAMPLE 3 | 4347 | $1.89 \times 10^5$ | 3955 | 0.67 |
| EXAMPLE 4 | 3963 | $1.75 \times 10^5$ | 3665 | 0.77 |

What is claimed:

1. A method of curing the polyepoxide resin binder component of a syntactic foam forming composition having a thickness in excess of circa 10 to 12 inches, and which comprises in admixture a curable polyepoxide resin matrix and a filler which comprises a plurality of hollow microspheres, said composition containing less than 45 percent by volume of hollow macrospheres, comprising the steps of; curing the polyepoxide component with a curing agent which is provided by the hydrolysis of the reaction product consisting essentially of (1) an organic polyepoxide curing agent possessing a primary amine group and (2) a mole of a ketone of the formula:

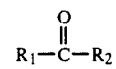

wherein $R_1$ and $R_2$ are each independently selected from the group consisting of monovalent organic radicals for each of said amine groups, said reaction product having been premixed and reacted before addition to the curable polyepoxide resin binder component, whereby said curing occurs.

2. The method of claim 1 wherein said ketone is acetone.

3. The method of claim 1 wherein said reaction product has the formula:

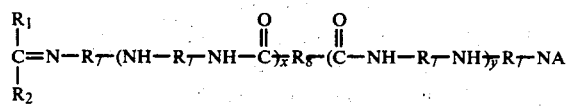
wherein $R_1$ and $R_2$ each represent hydrocarbyl; $R_7$ represents hydrocarbylene; A is selected from group consisting of the radical
and hydrogen; x is an integer of from 0 to 3; y is an integer of 0 to 3; and $R_8$ represents the residue of a polymerized fatty acid following removal of two carboxyl groups.
* * * * *